Feb. 21, 1933.  F. AESCHBACH  1,898,160
CUTTING MACHINE
Filed Sept. 18, 1931  3 Sheets-Sheet 2
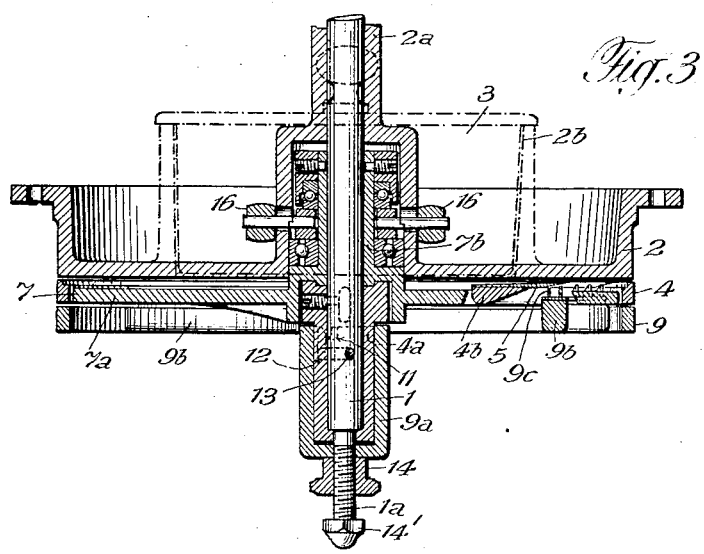
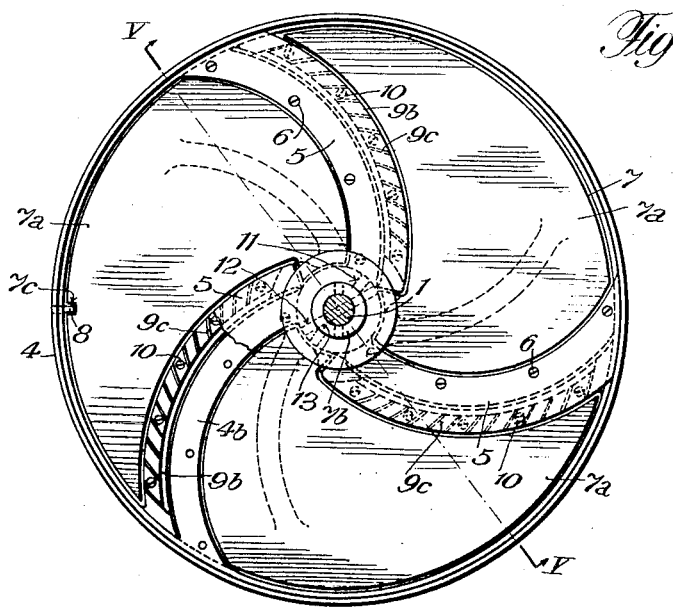
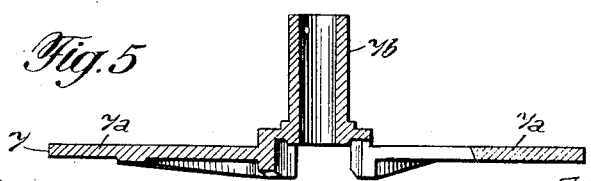
Inventor:
Friedrich Aeschbach
By Sommers & Young
attys

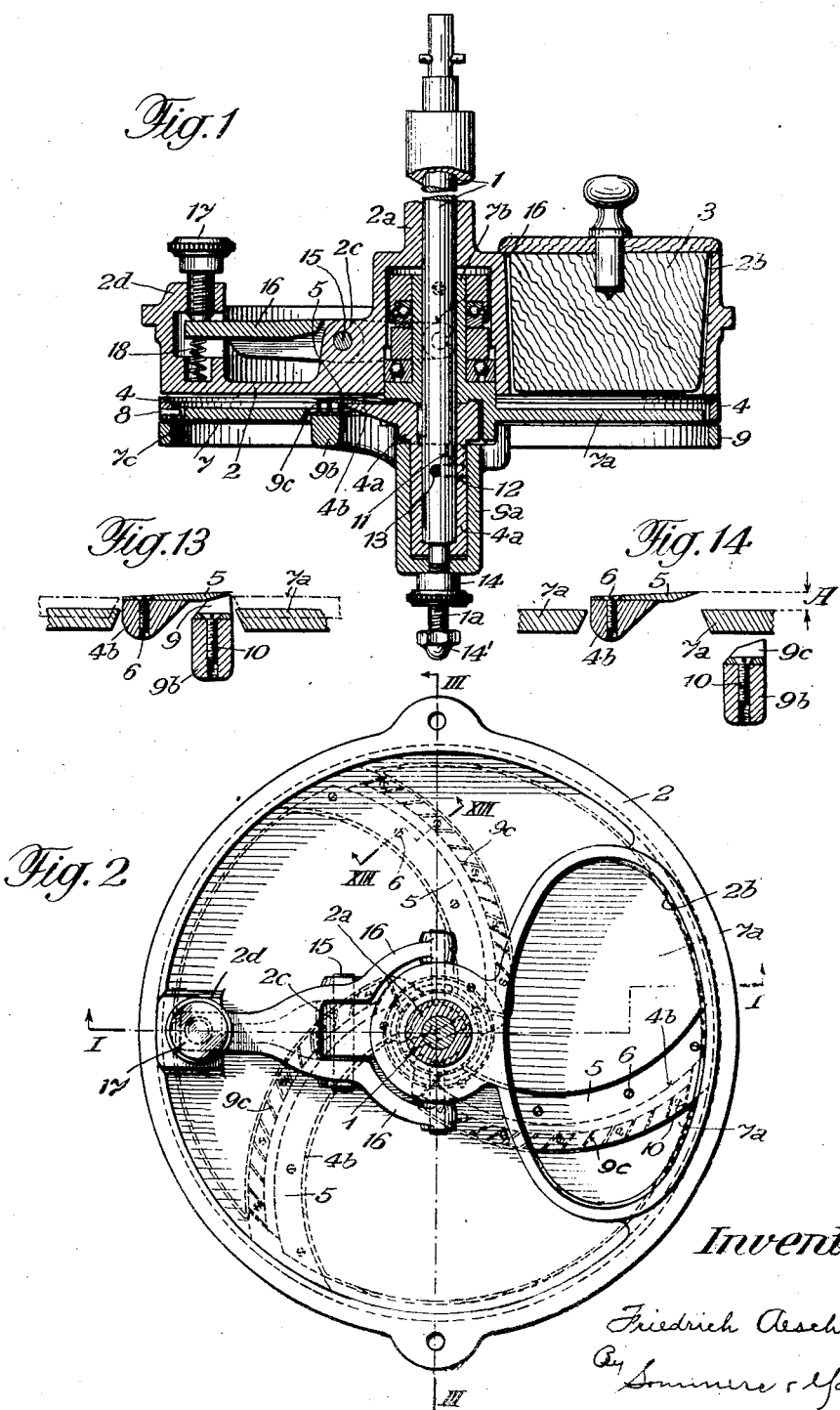

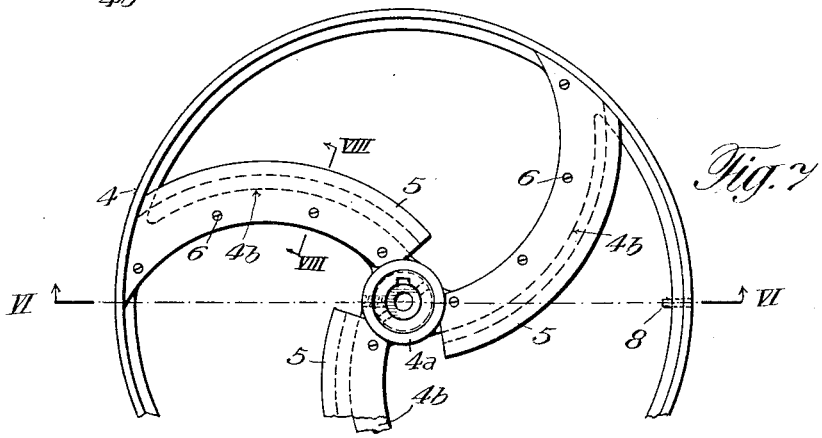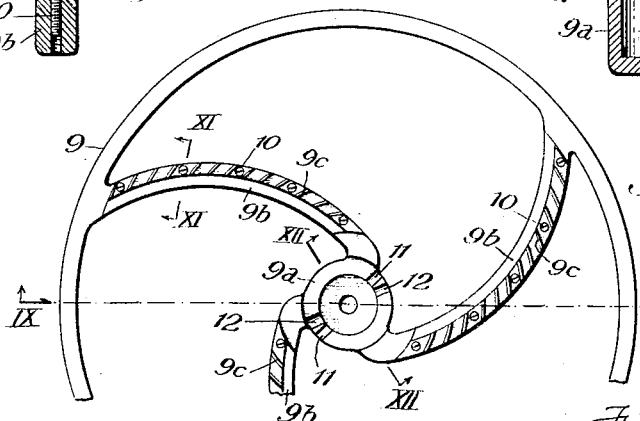

Patented Feb. 21, 1933

1,898,160

UNITED STATES PATENT OFFICE

FRIEDRICH AESCHBACH, OF AARAU, SWITZERLAND

CUTTING MACHINE

Application filed September 18, 1931, Serial No. 563,620, and in Switzerland May 22, 1931.

The invention relates to improvements in cutting machines. Cutting machines having a plurality of sickle-shaped cutting knives are known for cutting food stuffs (bread, potatoes, carrots, etc.) into the shape of slices.

For some kinds of preparing various food stuffs their shape as little sticks is the more suitable.

The subject matter of the present invention is a cutting machine having at least one sickle shaped cutting knife and a cutting table which is adjustable relatively to the knife and which permits the cutting of food stuffs into the form of slices or of sticks. To this end circular knives arranged at right angles to the cutting knife like teeth of a comb are provided which may be brought into and out of coooperation with the cutting knives at will.

A constructional example of the subject matter of the present invention is illustrated on the accompanying drawings, in which Fig. 1 shows a vertical section along line I—I in Fig. 2, of the cutting machine;

Fig. 2 is a plan view of the machine;

Fig. 3 is a section along line III—III in Fig. 2;

Fig. 4 is a plan view of the machine with the casing removed;

Fig. 5 is a section along the line V—V in Fig. 4 through the cutting table,

Fig. 6 is a section along line VI—VI in Fig. 7 through the carrier of the cutting knives.

Fig. 7 is a plan view of that carrier;

Fig. 8 is a section along line VIII—VIII in Fig. 7 through one arm of the carrier of the cutting knives with a cutting knife screwed thereto.

Fig. 9 is a section along line IX—IX in Fig. 10 of the carrier of the comb knives;

Fig. 10 is a plan view of the carrier of the comb knives;

Fig. 11 is a section along line XI—XI in Fig. 10 of an arm of the carrier of the comb knives with a comb knife screwed thereto, Fig. 12 shows in section the hub of the carrier of the comb knives, Fig. 13 is a partial section of cutting table, cutting knife and comb knife in their position for cutting the food stuff into the shape of sticks, and Fig. 14 is a similar section as Fig. 13 with the parts in position for cutting the food stuff into slices.

Referring now to the drawings the vertical shaft 1 of the machine is rotatably mounted in the neck 2a of the part 2 of the casing. The latter comprises a funnel-shaped container 2b into which the material to be cut is filled and is pressed in the downward direction by the aid of a block 3 (Fig. 1). On the shaft 1 the hub 4a of the carrier 4 of the cutting knifes is keyed. The carrier is provided with sickle-shaped arms 4b (Fig. 7) to which the sickle-shaped cutting knives 5 are fixed by screws 6. The interstices between the cutting knives are filled out by blade-shaped parts 7a (Fig. 4) which are cast in one with the hub 7b and form together the cutting table 7. The latter is axially displaceable relatively to the shaft 1 and is coupled to the carrier 4 of the cutting knives by means of a pin 8 projecting into a slot 7c (Fig. 4). On the hub 4a of the carrier of the cutting knives the hub 9a of the carrier 9 rests loosely (Figs. 1 and 3) i. e. the hub 9a may be angularly and axially displaced about the hub 4a. The carrier 9 is also provided with sickle-shaped arms 9b to which the circular short knives 9c arranged like the teeth of a comb and at right angles to the cutting knives 5 and hereafter called comb knives are fixed by the set screws 10 (Figs. 9 and 10).

In the upper portion of the hub 9a two axially extending slots 11 and 12 of different depth are provided beside each other (Figs. 10 and 12), each of the slots has its counter part diametrically opposite. A pin 13 is fixed in the shaft 1 at right angles to the axis of the latter and passes also through the hub 4a with its ends projecting out of the hub and adapted to enter into one or the other of the two slots 11, 12. In this manner two different positions between the carrier 9 of the comb knives and the carrier 4 of the cutting knives 4 are fixed as regards the axial and the angular direction.

The lower end of the driving shaft 1 is provided with a threaded pin 1a on which a screw nut 14 is provided, and to the end of the pin 1a a further screw nut 14' is screwed.

The adjustment of the cutting table to a desired cutting thickness is made by the following means: In a lug 2c cast in one with the casing part 2 a pin 15 is mounted which serves as fulcrum to a double armed lever 16, the inner forked-shaped end of which cooperates with the hub 7b of the cutting table and the outer end of which is acted upon by an adjusting screw 17 screwed into the eye 2d of the casing part 2. A spring 18 urges the end of the lever against the adjusting screw 17.

The operation of the above described cutting machine is as follows:

The food stuff to be cut is filled into the filling funnel 2b and is loaded with the block 3. The cutting table 7 is adjusted to a certain distance (A in Fig. 14) from the edges of the cutting knives 5, whereby the thickness of the slices produced is determined. This adjustment is made by turning the adjusting screw 17 in one or the other direction. Thereby the lever 16 is turned about its fulcrum and the forked end of the lever 16 causes a raising or lowering of the cutting table 7.

If it be desired to obtain the cut food stuff in the shape of little sticks the comb-knives 9c are brought into the position shown in Fig. 13 in which they cooperate with the cutting knives. To this end the deeper slots 12 of the hub 9a are made to cooperate with the projecting ends of the pin 13 and the carrier of the comb knives is secured in this position by tightening the screw nut 14. If the food stuff has thereafter to be cut again into slices the screw nut 14 is so far unscrewed that the ends of the pin 13 can be withdrawn from the slots 12 of the hub 9a. Thereupon the hub 9a is slightly turned until the ends of the pin 13 are above the less deep slots 11 and can be inserted into the latter; the screw nut 14 is again screwed home. The comb-knives 9c occupy then a position relatively to the cutting knives as illustrated in Fig. 14.

Instead of uniting the circular knives 9c to a comb-knife as illustrated they may be singly screwed to the knife carrier 9.

I claim:

1. In a cutting machine of the type described, in combination, a casing, a vertical shaft mounted in said casing, a plurality of sickle-shaped cutting knives, a carrier to which said knives are fixed, a hub on said carrier and fixed to said shaft, a cutting table, means for raising and lowering said cutting table, which means include a two-armed lever having a fork-shaped end engaging said hub, and an adjusting screw cooperating with the other end of the lever, the latter being fulcrumed in the casing in which the female thread for said adjusting screw is provided, a plurality of knives shaped as portions of concentric cylindrical surfaces arranged like the teeth of a comb and at right angles to said cutting knives, and means adapted to angularly and axially displace said comb-knives to bring the latter into and out of cooperation with said cutting knives.

2. In a cutting machine of the type described, in combination, a casing, a vertical shaft mounted in said casing, a plurality of sickle-shaped cutting knives, a carrier to which said knives are fixed, a hub on said carrier and fixed to said shaft, a cutting table, means for raising and lowering said cutting table, which means include a two-armed lever having a fork-shaped end engaging said hub, and an adjusting screw cooperating with the other end of the lever, the latter being fulcrumed in the casing in which the female thread for said adjusting screw is provided, a carrier having sickle-shaped arms and a hub, a plurality of knives arranged like the teeth of a comb and fixed to said arms, the cutting edges of said knives being shaped as portions of concentric cylindrical surfaces and standing at right angles to said cutting knives, a pin fixed to said shaft at right angles to the axis of the shaft, said pin adapted to cooperate with notches of different depth provided in the hub of the carrier of the comb-knives, said notches being angularly displaced to secure the carrier and thereby the comb-knives in its operative and nonoperative position as regards the cutting knives, and a screw-threaded nut to exert an axial pressure on said carrier of the comb-knives and securing it in the desired position.

3. In a cutting machine of the type described, in combination, a casing, a vertical shaft mounted in said casing, a plurality of sickle-shaped cutting knives, a carrier to which said knives are fixed, a hub on said carrier and fixed to said shaft, a cutting table, means for raising and lowering said cutting table, a plurality of knives shaped as portions of cylindrical surfaces and arranged like the teeth of a comb and at right angles to and below said cutting knives, and means adapted to simultaneously displace all of said comb-knives in the axial direction and angularly about the axis of the machine to bring said comb-knives into and out of cooperation with said cutting knives.

4. In a cutting machine of the type described, in combination, at least one sickle-shaped cutting knife, a cutting table adjustable relatively to said cutting knife, a plurality of knives shaped as portions of cylindrical surfaces and arranged like the teeth of a comb and at right angles to and below said cutting knife, and means adapted to raise said comb-knives by an axial displacement into cooperation with said cutting knife, the cutting edge of the said comb-knives bearing on the cutting knife in the operative position, and to bring said comb-knives out of cooperation with said cutting knife by an axial displacement in the downward direction and an angular displacement about the axis of the machine.

In testimony whereof, I have affixed my signature.

FRIEDRICH AESCHBACH.